United States Patent [19]

Chino et al.

[11] Patent Number: 5,069,934
[45] Date of Patent: Dec. 3, 1991

[54] PROCESS FOR PRODUCING MULTI-LAYERED MAGNETIC RECORDING MEDIA

[75] Inventors: Naoyoshi Chino; Norio Shibata; Hiroshi Chikamasa, all of Kanagawa, Japan

[73] Assignee: Fuji Photo Film Co., Ltd., Kanagawa, Japan

[21] Appl. No.: 623,637

[22] Filed: Dec. 6, 1990

[51] Int. Cl.[5] ............................................. H01F 10/02
[52] U.S. Cl. .................................... 427/131; 428/900
[58] Field of Search ................ 427/131, 129, 48, 130, 427/132; 428/694, 695, 900

Primary Examiner—Bernard Pianalio
Attorney, Agent, or Firm—Sughrue, Mion, Zinn Macpeak & Seas

[57] ABSTRACT

A multi-layer coating method by which multi-layered magnetic recording media having good recording characteristics can be produced consistently at high speed with multiple thin layers being coated simultaneously while insuring effective prevention of unwanted phenomena such as color unevenness and longitudinal streaks. A plurality of organic solvent based dispersions that are non-Newtonian fluids having fine particles dispersed therein are simultaneously applied in superposition onto a continuously running nonmagnetic support using an extrusion type applicator head. The coating operation is performed in such a manner that the Reynolds number as determined by the average of the kinetic viscosity coefficients of the dispersions, the coating speed and the equivalent diameter during coating is adjusted to 400 or below, and that, at the same time, the yield stress of at least the dispersion for the topmost layer is adjusted to 10 dyne/cm$^2$ or more. Further, the coating operation is performed in such a way that the ratio of $\eta_T$ to $\eta_H$ is adjusted to 50 or above, where $\eta_H$ is the viscosity of the dispersions at the rate of shear that is exerted upon the dispersions when they are applied using an extrusion type applicator head, and $\eta_T$ is the viscosity of the dispersions at the shear rate for the time period defined by the end of application and the entrance into the subsequent drying zone.

9 Claims, 2 Drawing Sheets

PROCESS FOR PRODUCING MULTI-LAYERED MAGNETIC RECORDING MEDIA

BACKGROUND OF THE INVENTION

The present invention relates to a process for producing magnetic recording media. More particularly, the invention relates to a process for producing a multi-layered magnetic recording medium wherein a plurality of magnetic dispersions using an organic solvent are simultaneously applied in superposition onto a continuously running nonmagnetic support.

In the production of magnetic recording media, efforts have recently been made to increase the recording density or reduce the thickness of the magnetic layer. Under these circumstances, manufacturers are making a shift from a single to a multiple layer construction in the magnetic layer that is coated on a nonmagnetic support. This is because, compared to magnetic recording media having a single magnetic layer, media having multiple magnetic layers can be significantly improved in magnetic recording characteristics, as evidenced by an increased storage capacity of magnetic data. To obtain this advantage, the number of magnetic layers must be at least two or more.

Methods for achieving the purpose of forming multiple magnetic layers are described, for example, in Japanese Examined Patent Publications Nos. 54-43362 and 58-43816, as well as Japanese Unexamined Published Patent Applications Nos. 51-11920, 52-51908 and 53-16604. The basic principle of these methods is to apply individual coating solutions one by one onto a nonmagnetic support and dry the successively applied solutions to form multiple coated layers.

However, these methods, which require the repetition of coating and drying steps, are low in productivity, and the equipment required therefor is inevitably bulky, with the additional disadvantage of high equipment cost. Further, irregularities sometimes occur at the interface between adjacent coated magnetic layers, which can cause either frequent generation of unwanted tape modulating noise or inadequate adhesion between layers.

Accordingly, it has been desired to develop a method by which multiple magnetic layers can be formed in a single run of coating and drying steps. However, if the coating method for achieving simultaneous application of two or more layers in superposition described in Japanese Unexamined Published Patent Application No. 62-124631 is adopted to apply a nonmagnetic coating solution and a magnetic coating solution or two coating solutions simultaneously in superposition using an organic solvent, color unevenness or longitudinal streaks are more likely to occur, even at low coating speeds, than in the method that involves repeated performance of successive coating and drying steps. This causes quality deterioration in terms of both the characteristics of electromagnetic conversion and appearance. Further, depending on the combination of formulas of coating solutions, the coating solution for the upper layer cannot be coated uniformly to form two distinct layers or, alternatively, the coating solution for the lower layer. These problems have been found to become serious as the coating solutions are applied in smaller quantities (i.e., as they are applied in smaller thicknesses) or as they are applied at higher speeds.

If coatability at high speed is the only concern, high-speed coating can be accomplished by reducing the viscosity of the coating solutions. However, if the support has an uneven surface due to such defects as wrinkles, a low-viscosity (highly flowable) coating solution applied will flow under gravity before it is dried and move in such a way as to compensate for the irregularities in the surface, thereby causing variations in the thickness of the coated layer.

If the viscosity of the coating solution is reduced, coatability at small thicknesses at high speed could be sufficiently improved to enable application of layers in superposition to some extent. In practice, however, if the solvent content in the magnetic dispersion is increased to lower the viscosity of the dispersion, it will take a comparatively long time to evaporate the solvent and hence dry the applied magnetic layer. If the drying time is prolonged, due to its high viscosity, the magnetic material will settle to the bottom of the magnetic layer, thereby making it impossible for the magnetic layer to exhibit its inherent performance.

This phenomenon, commonly referred to as "sedimentation", can theoretically be prevented by shortening the drying time. If, to this end, intense heat is applied to evaporate the solvent rapidly, the rapidly evaporating solvent will produce convection in the coating solution, and the resulting turbulence can cause adjacent layers to mix with other or deteriorate the surface properties of the coating solution. Further, the increase in the speed at which the drying air is blown against the coated surface often causes the support to run erratically, and also introduces irregularities on the coated surface or at the interface between layers, thereby causing adverse effects on the various characteristics of the applied magnetic layers. Thus, even if coating of layers in superposition can be accomplished to some extent, the poor surface properties of the magnetic layers can cause certain problems in actual use of the magnetic recording medium as the final product; for example, if it is used a video tape, video characteristics will be impaired by large noise.

It is also known that when two comparatively viscous fluids having different compositions are superposed in layers, eddy convection will occur even if the fluids are merely superposed one on the other without applying any external force. In order to reduce the occurrence of this eddy convection, both the density and the surface tension of either one of the adjacent fluid layers may be made higher or lower than those of the other layer. The occurrence of eddy convection can also be prevented by increasing the viscosities of the individual fluids to very high levels. (See Kaisetsu Toryogaku, "An Introduction to the Science of Paints", K. Mihara, ed., p. 211, Riko Shuppan, 1975).

However, if the densities and surface tensions of the magnetic dispersions are limited within very narrow ranges, the latitude in the applicability of magnetic dispersions is reduced to impractical low levels. Further, as already mentioned, increased viscosities deteriorate the coatability in thin layers at high speeds and hence are not desired.

Methods of coating multiple layers are also employed in the production of photographic materials and thermosensitive papers. Coating solutions for producing photographic materials utilize the sol-to-gel conversion of gelatin that is caused by temperature adjustment, so that the viscosity of coating solutions can be easily set in such a way that they produce not only a sol state which is optimum for coating purposes but also a gel state which is suitable for drying purposes. If the support is paper as in the case of thermal paper, the water in a coated solution is absorbed by the paper even if the solution itself is fairly low in viscosity and, as a result, the viscosity of the coated solution is sufficiently elevated to prevent unwanted irregularities from occurring in the coated layer in subsequent stages. Thus, the physical properties of substantially Newtonian fluids as exemplified by coating solutions used in the production of thermosensitive papers and photographic materials are largely dependent on their static viscosity (which can be easily determined by formulas) and, as mentioned above, their viscosity can be adjusted fairly easily, thereby making it possible to apply multiple coatings simultaneously.

However, magnetic coating solutions used in the production of magnetic recording media are non-Newtonian fluids and their viscosity is not constant but varies under specific conditions. Hence, it has been extremely difficult to control the viscosity-related physical properties of these magnetic coating solutions, and hence previous attempts to solve the aforementioned problems by adjusting the viscosities of the solutions according to specific conditions have been empirical. Under these circumstances, it has been very difficult to produce multi-layered magnetic recording media with unconventionally higher consistency in quality and at higher production rates.

SUMMARY OF THE INVENTION

An object, therefore, of the present invention is to provide a multi-layer coating method that is free from the aforementioned problems of the prior art, and by which multi-layered magnetic recording media having good recording characteristics can be produced consistently at high speed with multiple thin layers being coated simultaneously while insuring effective prevention of unwanted phenomena such as color unevenness and longitudinal streaks.

To this end, the present inventors conducted intensive studies on the physical properties of coating solutions on an applicator head, and the present invention has been accomplished on the basis of these studies.

The above-stated and other objects of the present invention can be attained by a process for producing a multi-layered magnetic recording medium in which a plurality of organic solvent based dispersions that are non-Newtonian fluids having fine particles dispersed therein are simultaneously applied in superposition onto a continuously running nonmagnetic support using an extrusion type applicator head, which process is characterized in that the coating operation is performed in such a manner that the Reynolds number as determined by the average of the kinetic viscosity coefficients of the dispersions, the coating speed and the equivalent diameter during coating is adjusted to 400 or below, and that, at the same time, the yield stress of at least the dispersion for the topmost layer is adjusted to 10 dyne/cm² or more.

The object can also be attained if the coating operation is performed in such a way that the ratio of $\eta_T$ to $\eta_H$ is adjusted to 50 or above, where $\eta_H$ is the viscosity of the dispersions at the rate of shear that is exerted upon the dispersions when they are applied using the extrusion type applicator head, and $\eta_T$ is the viscosity of the dispersions at the shear rate for the time period defined by the end of application and the entrance into the drying zone.

The object of the present invention can also be attained by a process for producing a magnetic recording medium containing three or more layers in which at least three organic solvent based dispersions that are non-Newtonian fluids having fine particles dispersed therein are simultaneously applied in superposition onto a continuously running nonmagnetic support using an extrusion type applicator head, which process is characterized in that the coating operation is performed in such a way that the largest of the Reynolds numbers between two adjacent layers as determined by the average of the kinetic viscosity coefficients of two of the dispersions above and below each interface, the coating speed and the equivalent diameter during coating is adjusted to 400 or below and that, at the same time, the yield stress of at least the dispersion for the topmost layer is adjusted to 10 dyne/cm² or more.

DESCRIPTION OF THE PREFERRED EMBODIMENTS

The Reynolds number, as is well known, is the ratio of inertial force to viscosity resistance and expressed by:

Reynolds number$(Re) =$ $$4 \times \frac{\text{velocity }(v) \times \text{equivalent diameter }(D)}{\text{average kinetic velocity coefficient }(\nu)}$$

where:
the velocity (v) is the coating speed in cm/sec;
the equivalent diameter (D) is the thickness in cm of a liquid layer on a doctor edge, provided that when coating is done with an extrusion-type applicator head urged against the support, equivalent diameter (D) shall be twice the thickness of wet coating;
the kinetic viscosity coefficient ($\nu$) is given by:

$$\nu = \frac{\text{viscosity}}{\text{specific gravity}} \text{ (cm}^2\text{/sec)}$$

the average kinetic viscosity ($\bar{\nu}$) for N coated layers is given by:

$$\bar{\nu} = \frac{\nu_1 + \nu_2 + \ldots \nu_N}{N} \text{ (cm}^2\text{/sec)}$$

Compared to the more accurate weighted kinetic viscosity coefficient which takes the proportions of the thicknesses of individual layers into account, the simple mean value has an error of no more than 10% and may safely be used for the purposes of the present invention.

We now describe the viscosity and yield stress $\tau_0$ of a magnetic dispersion. The viscosity of highly concentrated liquids containing fine particles of a magnetic material, carbon, an abrasive, etc., dispersed in a suitable binder and solvent is generally dependent on the gradient of the shear rate on account of the network structure of the particles. In particular, rigid rod-shaped fine particles as in a magnetic material will be oriented in some way as a result of their flow, causing a change in the flow characteristics of the liquid. Further, the cohesive force of the particles, especially the cohesive force due to the magnetic attraction of magnetic particles, will cause them to exhibit a non-Newtonian behavior. Hence, it is known that the relationship between the shear rate and shear stress of such non-Newtonian dispersions can be expressed by a Casson plot. (See "Shikizai (Colorants)", 60(3), pp. 167-175, 1987, and "Hyomen (Surfaces)", Vol. 25, No. 10, pp. 590-600, 1987).

Figure 4:
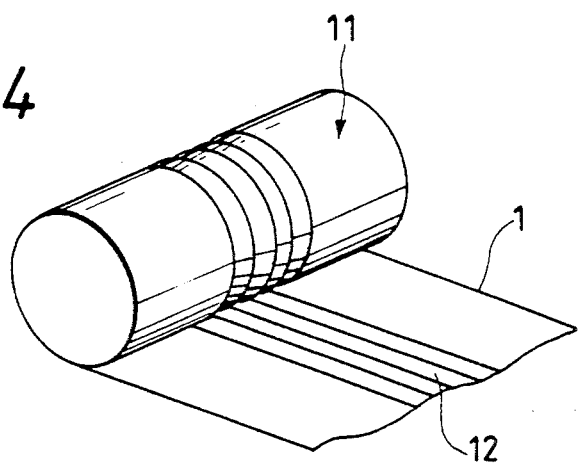
FIG. 4 is a perspective view showing a roll of support having wrinkles developed on its surface.

A Casson plot is constructed by plotting the square root of shear stress against the square root of shear rate, with the individual values of shear stress and shear rate being measured on samples of coating solution with a Rotovisco viscometer. FIG. 4 is a graph of the Casson plot in which the vertical axis plots the square root of shear stress ($\sqrt{\tau}$) and the horizontal axis plots the square root of shear rate ($\sqrt{\gamma}$). When the individual plots are connected, a substantially straight line is produced. Since shear stress is the product of viscosity and shear rate, it can be seen that the square of the gradient of the straight line represents the viscosity at infinite shear rate. Thus, the viscosity of each sample can be readily determined from FIG. 4. The square of the height of intercept of the vertical axis by a downward extension of the straight line in FIG. 4 is defined as "yield stress."

The Casson plot of a magnetic dispersion consists of a straight line in the region of low shear and a straight line in the high shear region, and this may be ascribed to differences such as those in the state of aggregation of the dispersion due to shear rate. Since the "yield stress" is the shear stress at the point where the shear rate is zero, it may be defined as a value on the downward extension of the straight line in the low shear region.

It is generally known that the coating speed and the coating amount (thickness) bear great importance in determining the specific conditions of coating multiple layers. The present inventors noted the Reynolds number as an index of these parameters and conducted further experiments. The shear rate in actual coating operations would be on the order of $10^4 - 10^7$ per second. However, viscosity measurements at shear rates higher than $10^4$/sec are not only difficult but also low in precision. Hence, viscosities that correspond or typify the shear rates above $10^4$/sec would more reasonably be approximated by Reynolds numbers that are determined on the basis of viscosities that are read from the slope of the straight line in the high viscosity region of the graph shown in FIG. 4 (said slope corresponds to the viscosity at an infinite shear rate). To take a shear rate of $4 \times 10^4$/sec as an example, the viscosity determined from the slope of that straight line is about $1/1.5-\frac{1}{2}$ of the value actually measured at that shear rate. However, the problem is more complicated in the coating of multiple layers since the thickness of coating, viscosity and other factors will vary from one layer to another. Stated more specifically, if layers of different compositions are coated in superposition, different velocity profiles will inevitably occur in the individual layers and the shear rate must first be determined from each velocity profile, the viscosity being then determined from that shear rate. However, this procedure is very complicated and is not suitable for practical use on an industrial basis.

Hence, as already mentioned, the kinetic viscosity coefficient in Reynolds number is approximated in the present invention by the average value of the kinetic viscosity coefficients of individual liquid layers, whereas the gradient of shear rate is approximated by a straight line.

Figure 2:
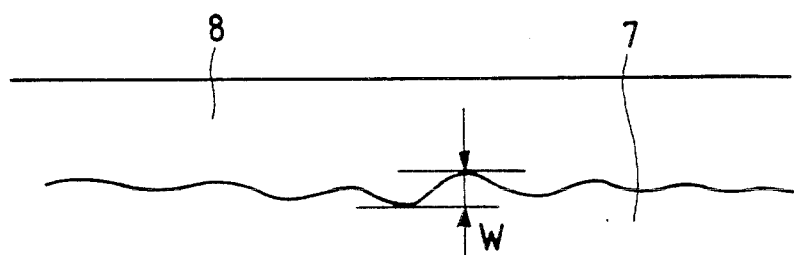
FIG. 2 is a section across the thickness of the upper and lower layers formed by simultaneous application of multiple coating solutions.
Figure 2:
Figure 3:
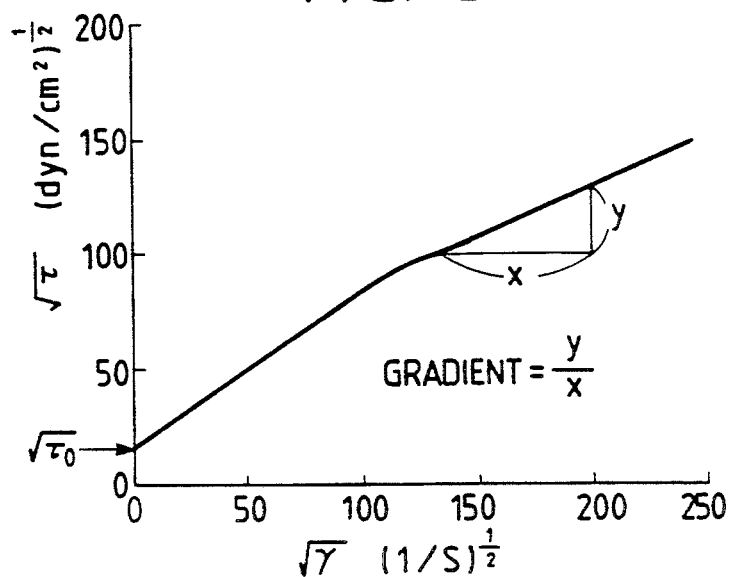
FIG. 3 is a graph showing the concept of a Casson plot.

Thus, the Reynolds number as considered in the present invention can be quantitatively defined on the basis of not only the stability of the degree of irregularities at the interface of layers due to such factors as the difference in the viscosity of coating solutions for multiple coating (i.e., the width of variations in the interface as indicated by W in FIG. 2), but also the stability of the behavior of coating solutions that will also affect areas other than the interface.

As a result of their repeated experimentation, the present inventors found unexpectedly that a substantial change occurred in the state of coated layers depending on whether the Reynolds number as defined above was higher or smaller than about 400, and it became clear that satisfactory results in coating could be attained by maintaining the Reynolds number at a value of about 400 or below. The lower limit of the Reynolds number is about $Re = 40-80$ since the viscosity is typically in the range of about 10-20 cPs and the coating speed in the range of about 50-100 m/min.

In the present invention, the "yield stress" is defined as the shear stress at the point where the rate of shear on a liquid of interest is zero, which may be regarded as an index of the fluidity inherent in the liquid (i.e., the minimum necessary force for destroying the network structure of particles to cause the liquid to flow). In general, the higher the value of yield stress, the lower the fluidity of the liquid at zero shear rate, and vice versa.

The present invention is based on the above. Its implications in the actual coating operations are that the greater the yield stress of a coating solution of interest, the greater the chance of it losing fluidity in a post-coating position away from the applicator head (i.e., the area where great shear force is exerted), whereby the liquid behavior of coating solutions at the interface of adjacent layers being applied is sufficiently stabilized to produce satisfactory coated layers, with the particular advantage of ease in maintaining the desired state of multiple coated layers. However, the loss of fluidity in a post-coating position does not mean that the coating solutions being applied have poor flowability. To the contrary, an extremely great shear rate is exerted during coating as between the doctor surface and the support at the extrusion type applicator head, so that the physical property of liquid as defined by the yield stress will in no way affect the physical properties of the liquid being applied which, in fact, are largely dependent on the physical properties related to the Reynolds number as defined hereinabove.

As a result of their repeated experimentation based on the yield stress discussed above, the present inventors found that a substantial difference occurred in the state of coated layers depending on whether the yield stress was either above or below 10 dyne/cm². It became clear that when the value of yield stress was adjusted to about 10 dyne/cm² or above, no adverse effects were observed during the application of coating solutions and satisfactory coating operations could be accomplished with the surface and other states of coated layers being maintained in a satisfactory manner in post-coating stages. In multiple coatings, the yield stress of the topmost layer would probably be the most important factor in determining the final quality of the coated surfaces.

As mentioned above, two conflicting characteristics are required for coating solutions in the coating and post-coating stages in order to perform simultaneous coating of multiple layers in a satisfactory manner. To deal with this problem, the present inventors conducted intensive studies in the hope that the range of necessary viscosity adjustments might be expressly defined by a certain formulated relationship. As a result, they found that very good results coold be attained when coating operations were performed in such a way that the ratio of $\eta_T$ to $\eta_H$ was adjusted to 50 or above, where $\eta_H$ is the viscosity of dispersions at the rate of shear that was exerted upon said dispersions when they were applied using an extrusion type applicator head, and $\eta_T$ is the viscosity of the dispersions at the shear rate for the time period defined by the end of application and the entrance into the drying zone. The upper limit of the ratio $\eta_T/\eta_H$ is not clear, but it may be estimated to lie in the range of about 100–400 since the viscosity in the low shear region is usually about 20 cPs.

As already mentioned, the viscosity of dispersions of the type contemplated by the present invention is dependent on the gradient of shear rate and rigid rod-shaped fine particles as in a magnetic material will be oriented in some way as a result of their flow, causing a change in the flow characteristics of the liquid. Further, the cohesive force of the particles, especially the cohesive force due to the magnetic attraction of magnetic particles, will lower the apparent viscosity of the dispersions in the high shear region. If the condition $\eta_T/\eta_H \geq 50$ is satisfied, the dispersions as applied will lose their fluidity to have a higher apparent viscosity in a post-coating position distant from the applicator head (the area where high shear force is exerted), whereby the behavior of liquid at the interface of adjacent coating solutions being applied is stabilized. Furthermore, if surface irregularities such as wrinkles are present in the support, or if there are protrusions on the surface of rolls or even if some adverse effects are likely to occur on account of drawing holes in suction rolls, an unwanted liquid flow such as one that will compensate for those irregularities and other defects can be avoided, thereby making it possible to reduce the variations that may occur in the thickness of individual coated layers.

As described above, in order to deal with the prior art problem associated with the two conflicting requirements of coating solutions (i.e., high fluidity is necessary in the coating stage but low fluidity is required in the post-coating stage), the present inventors have formulated guidelines for the ranges of adjustment on the basis of several relevant parameters, whereby not only could the fluidity of coating solutions being applied be maintained at high level but also the liquid fluidity of the same solutions could be made sufficiently low after coating to maintain the as-applied state of layers, so that the behavior of liquid at the interface between layers could be stabilized in a reliable manner. Further, the coating solutions, both during and after coating, are made sufficiently insensitive to adverse effects such as the running of the support and the pressure of drying air so that an improvement in coating speed which has heretofore been impossible in the prior art can be readily accomplished without causing any coating defects including color unevenness and longitudinal streaks. As a result, the process of the present invention insures consistent supply of multiple (which may be three or more) layered magnetic recording media having not only good magnetic recording characteristics but also improved surface properties.

In an experiment conducted by the present inventors for the coating of three layers, it was sometimes found that even when the Reynolds number of the three layers taken as a whole was 400 or below, the surface of coated layers or the interface between adjacent layers was irregular. Such irregularities on the surface of coated layers or at the interface between adjacent layers could be readily checked by examining, under magnification, a cross section of a sample prepared by applying coating solutions and drying the coated layers.

Upon closer studies, it was revealed that when irregularities occurred at the interface between the topmost and middle layers, the Reynolds number between those two layers was greater than 400, and this fact led to the conclusion that irregularities would occur at the interface between adjacent layers if the Reynolds number between those layers exceeded 400.

It was also found that when a coating solution having low yield stress was used to form the topmost layer, the latter had a Reynolds number of 400 or below but that irregularities occurred both at the interface and on the surface of that layer as the drying temperature was elevated.

Hence, it has been found that in the coating of three or more layers, satisfactory multi-layered magnetic recording media can be produced by performing the coating operation in such a way that the largest of the Reynolds numbers that are calculated from the average of kinetic viscosity coefficients between fluids that form adjacent layers with an interface being present therebetween is adjusted to no more than 400 and that the yield stress of the coating solution for the topmost layer is adjusted to at least 10 dyne/cm$^2$.

Judging from the results of those two cases—two-layer coating and three-layer coating—it can safely be estimated that in the case of coating four or more layers, good results will be obtained if the coating operation is performed in such a way that the largest of the Reynolds numbers of coating solutions forming adjacent layers is adjusted to no more than 400.

While there are several methods for adjusting the viscosity as an element of the Reynolds number, two primary effective methods are by changing the formula of coating solutions and by changing the shear rate. In the former method (i.e., changing the formula of coating solutions), one may alter the amount of solvent in a coating solution (magnetic dispersion), thereby allowing it to have viscosity characteristics such as those obtained by shifting the initial viscosity curve (also named "flow curve" in a graph in which viscosity is plotted on the vertical axis and shear rate on the horizontal axis) substantially parallel to the horizontal axis. Alternatively, a coating solution that shows a viscosity curve having a different gradient characteristic can be prepared by changing the amount of binder or the type and amount of magnetic material used. In other method (i.e., changing the shear rate), the shear rate on a doctor edge can be maintained at a desired level by properly adjusting the quantity of flow from the applicator head or the coating speed (the travelling speed of the support).

The process of the present invention is applicable to a wide range of fluids that are non-Newtonian in behavior and for which a Casson plot can be constructed. To mention a few examples, the process is applicable to carbon black dispersions, abrasive dispersions and various other dispersions of fine particles.

According to one aspect, the present invention provides a process for producing a magnetic recording media in which a plurality of magnetic dispersions are simultaneously applied in superposition using an extrusion type applicator head, which process is characterized in that the coating operation is performed in such a way that the Reynolds number as determined by the average of the kinetic viscosity coefficients of the dispersions, the coating speed and the equivalent diameter during coating is adjusted to 400 or below and that, at the same time, the yield stress of at least the dispersion for the topmost layer is adjusted to 10 dyne/cm$^2$ or above. By adjusting the above-defined Reynolds number to 400 or below, the fluidity of dispersions being coated can be held sufficiently high and, at the same time, the behavior of liquid at the interface of overlapping layers can be stabilized in a reliable manner to insure high coating speeds. Further the coating operation is also performed in such a way that the yield stress of at least the dispersion for the topmost layer is adjusted to 10 dyne/cm$^2$ or more, which provides the overall dispersions with sufficiently reduced flowability after coating to eliminate the possibility that the behavior of liquid at the interface between adjacent layers become instable on account of disturbances in the liquid that can result from solvent evaporation from the coated layers. Further, the coating solutions, both during and after coating, are made sufficiently insensitive to adverse effects such as the erratic running of the support and the pressure of drying air so that an improvement in coating speed which has heretofore been impossible in the prior art can be readily accomplished without causing any coating defects such as color unevenness and longitudinal streaks in the dry solidified layers of coating. As a result, the present invention insures consistent supply of multi-layered magnetic recording media having not only good magnetic recording characteristics but also improved surface properties.

According to another aspect of the present invention, the coating operation is performed in such a way that the ratio of $\eta_T$ to $\eta_H$ is adjusted to 50 or above, where $\eta_H$ is the viscosity of the dispersions at the rate of shear that is exerted upon said dispersions when they are applied using the extrusion type applicator head, and $\eta_T$ is the viscosity of the dispersions at the shear rate for the time period defined by the end of application and the entrance into the drying zone. In this case, the apparent viscosity of dispersions can be held low in the high shear region and high in the low shear region that follows the coating stage, thereby serving to stabilize the behavior of liquid at the interface of coating solutions that contact one another during coating. Further, even if the support has surface irregularities such as wrinkles, an unwanted liquid flow such as one that will compensate for those irregularities can be avoided to minimize the variations that might occur in the thickness of individual coated layers. As a result, the second aspect of the present invention also insures consistent supply of multi-layered magnetic recording media having not only good magnetic recording characteristics but also improved surface properties.

According to a further aspect of the present invention which is particularly directed to the simultaneous coating of three or more layers, the largest of the Reynolds numbers that are calculated from the average of the kinetic viscosity coefficients between liquids that form adjacent layers forming an interface therebetween is adjusted to 400 or less and, at the same time, the yield stress of at least the coating solution for the topmost layer is adjusted to 10 dyne/cm$^2$ or more. This is effective in eliminating the possibility that the behavior of liquid at the interface between adjacent layers become instable on account of disturbances in the liquid that can result from solvent evaporation from the coated layers. Further, the coating solutions, both during and after coating, are made sufficiently insensitive to adverse effects such as the erratic running of the support and the pressure of drying air. As a result, the third aspect of the present invention also insures consistent supply of multi-layered magnetic recording media having not only good magnetic recording characteristics but also improved surface properties.

The following examples are provided for the purpose of further clarifying the advantages of the present invention but are in no way to be taken as limiting.

EXAMPLE 1

An example of dual-layer coating is first described below.

Samples of a magnetic coating solution (Nos. 1-6) were prepared by mixing and dispersing the necessary ingredients to the formulas shown in Table 1, in which all numeric values are in "parts by weight". As for the content of cyclohexanone in each coating solution, two coating solutions were combined in such a way that the content of the compound in the lower layer was higher than in the upper layer by 10 parts by weight.

TABLE 1

| Coating solution | 1 | 2 | 3 | 4 | 5 | 6 |
|---|---|---|---|---|---|---|
| Magnetic material (SBET value in parentheses) | 100 (42) | 100 (42) | 100 (38) | 100 (50) | 100 (30) | 80 (30) |
| Vinyl chloride/vinyl acetate copolymer | 11 | 14 | 10 | 10 | 14 | 10 |
| Polyurethane ("Nipporan 3041") | 7 | 3 | 5 | 6 | 3 | 3 |
| Curing agent | 10 | 15 | 20 | 20 | 20 | 20 |
| α-alumina | 10 | 10 | 10 | 10 | 10 | 10 |
| Carbon black (av. particle size, 80 mμ) | 5 | 5 | 5 | 5 | 5 | 5 |
| Stearic acid | 1 | 1 | 1 | 1 | 1 | 1 |
| Oleic acid | 1 | 1 | 1 | 1 | 1 | 1 |
| Methyl ethyl ketone | 70 | 80 | 105 | 150 | 116 | 145 |
| Butyl acetate | 60 | 70 | 100 | 150 | 110 | 135 |

TABLE 1-continued

| Coating solution | 1 | 2 | 3 | 4 | 5 | 6 |
|---|---|---|---|---|---|---|
| Cyclohexanone | 20 | 20 | 20 | 20 | 20 | 20 |

The yield stress and viscosity in high shear region of each of sample Nos. 1-6 were calculated by the method used to construct the Casson plot shown in FIG. 4. The results are shown in Table 2 below. Based on the viscosity data, shear rate was measured at ambient temperature using a Rotovisco viscometer Model PG 142, RV 2 of Gebruder Haake.

TABLE 2

| Coating Solution | 1 | 2 | 3 | 4 | 5 | 6 |
|---|---|---|---|---|---|---|
| Viscosity $\eta$ (P) | 0.25 | 0.19 | 0.13 | 0.036 | 0.058 | 0.029 |
| Yield stress $\tau_0$ (dyne/cm$^2$) | 408 | 149 | 98 | 84.6 | 10.3 | 2.3 |

Figure 1:
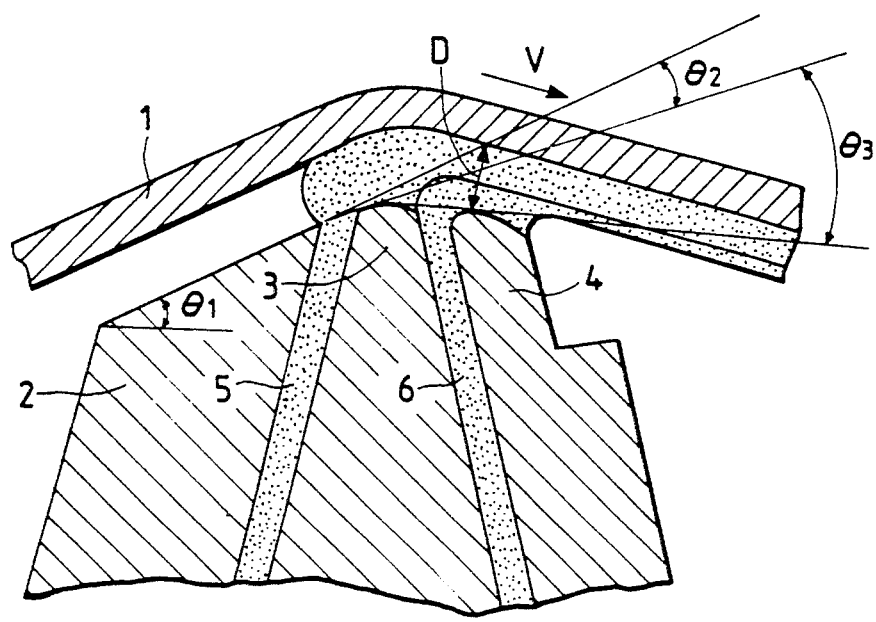
FIG. 1 is a schematic side view of an applicator head used in the coating step of the process of the present invention according to one embodiment, together with the state of coating solutions being applied.

The coating solutions thus prepared were applied onto polyethylene terephthalate bases having a width of 520 mm, a thickness of 15 μm and a surface roughness (Ra) of 0.015 μm. The applicator head had the construction shown in FIG. 1 (which was the same as the applicator head shown in FIGS. 1-4 of Japanese Unexamined Published Patent Application No. 63-88080). The head had the following dimensions: $\theta_1$ (the angle by which the back edge surface was inclined rom the horizontal plane) = 20°; $\theta_2$ (the angle the first tangential line connecting the rear apex of the back edge to the upstream doctor edge surface formed with an extension of the back edge surface) = 7°; $\theta_3$ (the angle an extension of the first tangential line formed with the tangential line connecting the rear end apex of the upstream doctor edge and the edge surface of the downstream doctor edge) = 3°; $R_1$ (the radius of curvature of the first doctor edge surface) = 2 mm; $R_2$ (the radius of curvature of the second doctor edge surface) = 3 mm; the wall thickness of each doctor edge = 0.5-1.0 mm; the width of each slit = 0.3 mm; slit length = 60 mm at entrance end and 50 mm at opposite end; and the diameter of each pocket = 20 mm.

The coating solutions were applied under a tension of 10 kg for a unit width of 500 mm, and the coated layers were dried with drying air being blown substantially perpendicular to the support through a slit 5 mm wide that was located above the support. The drying air velocity was properly adjusted within the range of 5-10 m/sec in accordance with the coating speed used. The term "initial drying" in Table 3 means drying within 5 seconds of passage through the entrance to the drying zone, and the temperature for the subsequent stage of drying was adjusted within the range of 40°-110° C. The coating speed (v) and the wet thickness of coating were varied as shown in Table 3.

Coating solution Samples Nos. 1-6, as properly combined, were applied in superposition onto the nonmagnetic bases and dried to fabricate magnetic recording media. The results are shown in Table 3.

The recording media were evaluated by measuring the surface roughness of the magnetic coating and examining the state of irregularities at the interface between the upper and lower magnetic layers. The results of surface roughness measurement were rated by the following criteria: O, Ra after coating = 0.013 – 0.018 μm; Δ, 0.19–0.021 μm; X, 0.022 μm and above. The state of irregularities at the interface was examined by measuring the width W of variations of the interface across the thickness of the magnetic coating as shown in FIG. 2 and the results were rated by the following criteria: O, W ≦ 0.2 μm; Δ, 0.2 – 0.3 μm; X, 0.3 μm and above.

TABLE 3

| Coating Solution | | Lower layer | | | | Upper layer | | | |
|---|---|---|---|---|---|---|---|---|---|
| | | Viscosity | Density | Wet Thickness | Yield Stress | Viscosity | Density | Wet Thickness | Yield Stress |
| Lower Layer | Upper Layer | $\eta$ (P) | $\rho$ (g/cm$^3$) | t (cm) | $\tau$ (dyn/cm$^2$) | $\eta$ (P) | $\rho$ (g/cm$^3$) | (cm) | $\tau$ (dyn/cm) |
| 3 | 5 | 0.13 | 1.21 | 0.002 | 98 | 0.058 | 1.15 | 0.001 | 10.3 |
| 3 | 5 | 0.13 | 1.21 | 0.002 | 98 | 0.058 | 1.15 | 0.0005 | 10.3 |
| | | | | | | | | 0.002 | |
| | | | | | | | | 0.003 | |
| 3 | 5 | 0.13 | 1.21 | 0.002 | 98 | 0.058 | 1.15 | 0.003 | 10.3 |
| 3 | 6 | 0.13 | 1.21 | 0.002 | 98 | 0.029 | 1.11 | 0.0005 | 2.3 |
| | | | | | | | | 0.002 | |
| | | | | | | | | 0.003 | |
| | | | | | | | | 0.003 | |
| 3 | 6 | 0.13 | 1.21 | 0.002 | 98 | 0.029 | 1.11 | 0.0025 | 2.3 |
| 3 | 4 | 0.13 | 1.21 | 0.002 | 98 | 0.036 | 1.09 | 0.0005 | 84.6 |
| | | | | | | | | 0.001 | |
| | | | | | | | | 0.002 | |
| | | | | | | | | 0.0025 | |
| 3 | 5 | 0.13 | 1.21 | 0.002 | 98 | 0.058 | 1.15 | 0.003 | 10.3 |
| | | | | | | | | 0.003 | |
| | | | | | | | | 0.003 | |
| 6 | 3 | 0.029 | 1.11 | 0.002 | 84.6 | 0.13 | 1.21 | 0.002 | 98 |
| 4 | 3 | 0.036 | 1.09 | 0.002 | 84.6 | 0.13 | 1.21 | 0.001 | 98 |
| | | | | 0.003 | | | | | |
| 1 | 2 | 0.25 | 1.29 | 0.002 | 408 | 0.19 | 1.25 | 0.001 | 149 |
| 2 | 1 | 0.19 | 1.25 | 0.002 | 149 | 0.25 | 1.29 | 0.001 | 408 |

Average of

TABLE 3-continued

| Coating Solution Lower Layer | Coating Solution Upper Layer | Coating Speed V (cm/sec) | kinetic viscosity coefficients of upper and lower layers (cm³/sec) | Re | Air temperature for initial drying (°C.) | Results of Coating Surface Roughness | Irregularities at surface |
|---|---|---|---|---|---|---|---|
| 3 | 5 | 333 | 0.079 | 111.2 | 80 | O | O |
|   |   | 666 |       | 202.4 |    |   |   |
|   |   | 833 |       | 253.2 |    |   |   |
| 3 | 5 | 666 | 0.079 | 168.8 | 80 | O | O |
|   |   |     |       | 269.6 |    |   |   |
|   |   |     |       | 337.6 |    |   |   |
| 3 | 5 | 833 | 0.079 | 421.8 | 80 | X | X |
| 3 | 6 | 666 | 0.067 | 198.8 | 80 | Δ | X |
|   |   | 666 |       | 378.0 |    | Δ | X |
|   |   | 666 |       | 397.6 |    | X | X |
|   |   | 833 |       | 497.2 |    | X | X |
| 3 | 6 | 600 | 0.067 | 322 | 40 | O | Δ |
|   |   |     |       |     | 80 | Δ | X |
|   |   |     |       |     | 100 | X | X |
| 3 | 4 | 666 | 0.070 | 190.4 | 80 | O | O |
|   |   |     |       | 228.4 |    |   |   |
|   |   |     |       | 304.4 |    |   |   |
|   |   |     |       | 342.4 |    |   |   |
| 3 | 5 | 700 | 0.079 | 354.4 | 40 | O | O |
|   |   |     |       |       | 80 |   |   |
|   |   |     |       |       | 100 |   |   |
| 6 | 3 | 666 | 0.067 | 318 | 80 | O | O |
|   |   |     |       | 397.6 |    |   |   |
| 4 | 3 | 666 | 0.070 | 228.4 | 100 | O | O |
|   |   |     |       | 304.4 |     |   |   |
| 1 | 2 | 666 | 0.1729 | 92.4 | 100 | O | O |
| 2 | 1 | 666 | 0.1729 | 92.4 | 100 | O | O |

As Table 3 shows, the evaluation of surface roughness (i.e., color unevenness and longitudinal streaks) was in agreement with that of the state of irregularities at the interface, and simultaneous application of two magnetic layers could be accomplished satisfactorily by adjusting the Reynolds number to 400 or below and maintaining the yield stress at about 10 dyne/cm² or above.

EXAMPLE 2

Surface irregularities such as wavy wrinkles may often develop in a support which is wound onto a roll prior to the coating operation (see FIG. 4 in which the roll 11 of the support 1 is shown to have wavy wrinkles 12 on the surface). In Example 2, the relationship between the effect of such irregularities on the formation of magnetic coating and the ratio of viscosity after coating ($\eta_T$) to the viscosity during coating ($\eta_H$) was examined. The coating procedure was the same as in Example 1 including the drying condition. Coating solution Samples Nos. 1, 2, 4 and 5 were used to form the lower layer whereas coating solution Samples Nos. 2, 4, 5 and 6 were used to form the upper layer. The coating weight was 20 cc/m² for the lower layer and 10 cc/m² for the upper layer. The coating speed was 833 cm/sec. The support was a polyethylene terephthalate film having a thickness of 15 μm and a width of 520 mm and, as shown in FIG. 4, it had wrinkles extending in the direction parallel to its transport. The results of coating were evaluated by permitting light to pass through the areas of the support where wrinkles were present and then checking the degree of unevenness in the thickness of coating by measuring the light transmission.

The coating solutions as applied are subjected to shear force which is chiefly created by flows under gravity. Since this shear force can safely be estimated to be extremely small, the rate of shear on each coating solution was assumed to be approximately 5/sec and the viscosity was estimated on the basis of this value of shear rate.

TABLE 4

| Coated sample | 1 | 2 | 3 | 4 | 5 | 6 |
|---|---|---|---|---|---|---|
| Coating solution for upper layer | 6 | 2 | 5 | 4 | 4 | 4 |
| Coated solution for upper layer | 4 | 4 | 4 | 1 | 2 | 5 |
| Coating speed | 833 | 833 | 833 | 833 | 833 | 833 |
| $\eta_T/\eta_H$ for lower layer | 186.9 | 186.9 | 186.9 | 25.2 | 181.5 | 52.8 |
| $\eta_T/\eta_H$ for upper layer | 25.2 | 181.5 | 52.8 | 186.9 | 186.9 | 186.9 |
| Rating | X | O | OΔ | X | O | OΔ |

Table 5 shown both the coating-equivalent viscosity and the viscosity at shear rate ($\gamma$) of 5 of each of coating solution sample Nos. 2, 3, 5 and 6.

TABLE 5

| Coating solution | 2 | 3 | 5 | 6 |
|---|---|---|---|---|
| Coating-equivalent viscosity (P) | 0.19 | 0.13 | 0.058 | 0.029 |
| Viscosity at $\gamma = 54$ (P) | 34.5 | 24.3 | 3.06 | 0.73 |

The viscosities at $\gamma=5$ were about one-third to one-fourth of the values measured with a Brookfield type viscometer at a rotational speed of 12 rpm.

The data in Table 5 shows that when the ratio of viscosity at $\gamma=5$ to coating-equivalent viscosity of coating solutions was adjusted to 50 and above, the coating solutions had sufficiently high fluidity during coating (i.e., where the shear rate was high) to insure satisfactory application irrespective of the wrinkles on the support whereas the coating solutions had such a low fluidity just after coating (i.e., where the effective shear rate was only due to gravity) that they would not cause any unevenness in the thickness of coating such as by filling the grooves in the support. Accordingly, satisfactory magnetic layers could be formed.

EXAMPLE 3

Figure 5:
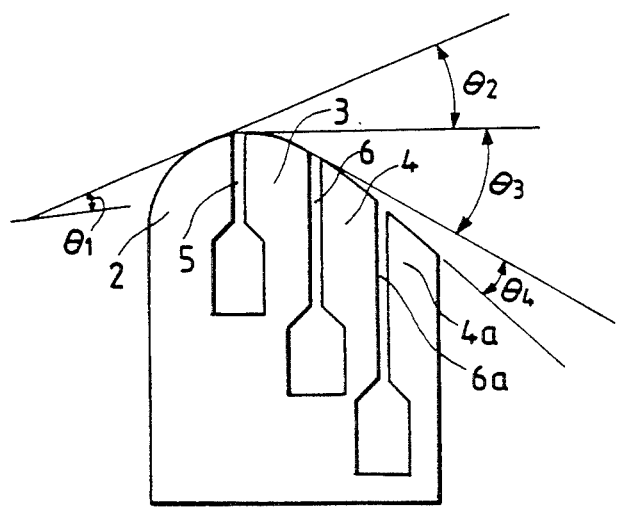
FIG. 5 is a cross section of an applicator head for three-layer coating.

In this example, three magnetic layers were coated simultaneously in superposition. The coating method was basically the same as the two-layer coating method described in Japanese Unexamined Published Patent Application No. 63-88080 and the applicator head used was constructed as shown in FIG. 5 by adaptation from the head for three-layer coating described in Japanese Unexamined Published Patent Application No. 58-109162. Compared to the applicator head for dual-layer coating shown in FIG. 1, the head used in Example 3 had an additional slit 6a and doctor edge 4a for coating the top layer.

connecting the downstream end of the edge surface for coating the second or middle layer to the edge surface for coating the third layer formed with the tangential line connecting the downstream end of the edge surface for coating the first or bottom layer to the edge surface for coating the second layer) = 1.5°.

The coating solutions were the same as those used in Example 1 and they were combined to provide four levels as shown in Table 6.

The other coating conditions and the methods of evaluating surface roughness and irregularities at the interface were the same as in Example 1. Reynolds numbers were calculated by the same basic formula as set forth hereinabove except that the equivalent diameter D was the thickness (cm) of liquid on the edge surface for coating the third layer. For determining the total Reynolds number [Re(T)] of the three layers taken as a whole, the kinetic viscosity coefficients of the individual layers were calculated from their viscosities and specific gravities and the simple mean of those values was taken. For determining the Reynolds number at each interface of adjacent layers, the kinetic viscosity coefficients of two layers forming the interface were calculated from their viscosities and specific gravities and the simple mean of those values was taken. The results are shown in Table 6, in which Re(mid-top) represents the Reynolds number between the middle and top layers and Re(mid-bottom) represents the Reynolds number between the middle and bottom layers.

TABLE 6

| Coating Solution | Viscosity $\eta$ (P) | | Specific Gravity $\rho$ (g/cm$^2$) | | Wet Thickness t (cm) | | Coating Speed v (cm/sec) | Re(T) | Re(mid-top) Re(mid-bottom) | Drying Temperature (°C.) | Results of Coating | |
|---|---|---|---|---|---|---|---|---|---|---|---|---|
| | | | | | | | | | | | Surface Roughness | Irregularities at Interface |
| Level 1 | | | | | | | | | | | | |
| Bottom layer (base side) | $\eta_1$ | 0.19 | $\rho_1$ | 1.25 | $t_1$ | 0.0015 | 500 | 153.8 | Re(mid-top) = 285.7 Re(mid-bottom) = 118.8 | 100 | O | O |
| Middle layer | $\eta_2$ | 0.058 | $\rho_2$ | 1.15 | $t_2$ | 0.001 | | | | | | |
| Top layer | $\eta_3$ | 0.036 | $\rho_3$ | 1.09 | $t_3$ | 0.0005 | | | | | | |
| Level 2 | | | | | | | | | | | | |
| Bottom layer (base side) | $\eta_1$ | 0.19 | $\rho_1$ | 1.25 | $t_1$ | 0.0015 | 666 | 204.9 | Re(mid-top) = 380.6 Re(mid-bottom) = 158.2 | 100 | O | O |
| Middle layer | $\eta_2$ | 0.058 | $\rho_2$ | 1.15 | $t_2$ | 0.001 | | | | | | |
| Top layer | $\eta_2$ | 0.036 | $\rho_3$ | 1.09 | $t_3$ | 0.0005 | | | | | | |
| Level 3 | | | | | | | | | | | | |
| Bottom layer (base side) | $\eta_4$ | 0.19 | $\rho_1$ | 1.25 | $t_1$ | 0.0015 | 750 | 230.7 | Re(mid-top) = 428.6 Re(mid-bottom) = 178.2 | 100 | Δ ~ X (irregularities at the interface between top and middle layers) | X |
| Middle layer | $\eta_2$ | 0.058 | $\rho_2$ | 1.15 | $t_2$ | 0.001 | | | | | | |
| Top layer | $\eta_3$ | 0.036 | $\rho_3$ | 1.09 | $t_3$ | 0.0005 | | | | | | |
| Level 4 | | | | | | | | | | | | |
| Bottom layer | $\eta_1$ | 0.19 | $\rho_1$ | 1.25 | $t_1$ | 0.0015 | 500 | 157.9 | Re(mid-top) = 315.8 Re(mid-bottom) = 118.8 | 40 | O | Δ |
| Middle layer | $\eta_2$ | 0.058 | $\rho_2$ | 1.15 | $t_2$ | 0.001 | | | | | 80 | Δ | X |
| Top layer | $\eta_3$ | 0.029 | $\rho_3$ | 1.11 | $t_3$ | 0.0005 | | | | | 100 | X | X |

The edge dimensions were the same as shown in Example 1 except for the following points: R$_3$ (the radius of curvature of the edge for coating the third or top layer) = 3.2 mm; and $\theta_4$ (the angle the tangential line The data in Table 6 shows that even when the total Reynolds number of the three layers taken as a whole was 400 or below, irregularities could sometimes occur in the surface of the coating or at the interface between adjacent layers as demonstrated by the case of level (3). Such irregularities in the surface of the coating or at the interface between adjacent layers could be checked by examining a cross section of the coating formed by applying and drying the coating solutions.

In the experiment conducted in Example 3, irregularities were found to occur at the interface between the top and middle layers. As shown in Table 6, the Reynolds number between those two layers was found to exceed 400 and this indicates that irregularities can occur at the interface between adjacent layers if the Reynolds number at that interface is greater than 400.

Further, when a coating solution of low yield stress was used to form the top layer as in the case of level (4), the Reynolds numbers, both total and interfacial, were not more than 400, but as the drying temperature increased, irregularities occurred both in the surface of the coating and at the interface between adjacent layers.

As demonstrated in Example 3, if three or more layers are coated in such a way that the largest of the Reynolds numbers that are calculated from the average of the kinetic viscosity coefficients of two layers forming an interface is adjusted to 400 or below and that the yield stress of at least the coating solution for the topmost layer is adjusted to 10 dyne/cm$^2$ or more, satisfactory multi-layered magnetic recording media can be produced.

Example 3 refers to the case of three-layer coating but if the case of dual-layer coating described in Example 1 is also taken into account, one can easily deduce that satisfactory results can be attained by applying coating solutions in such a way that the largest of the Reynolds numbers between adjacent layers is adjusted to 400 or below.

It therefore became apparent that two or three or even more layered magnetic recording media could be produced consistently by performing the coating operation under the following conditions employed in Examples 1-3; coating speed, about 200-500 m/min (or 100-800 m/min depending on the physical properties of coating solutions); coating weight, 45 cc/m$^2$ (which may be increased up to 60 cc/m$^2$ depending on the type of coating solution and the coating speed); viscosity, 0.02-0.25 poise (as measured by the method adopted in Examples 1-3).

What is claimed is:

1. In a process for producing a multi-layered magnetic recording medium in which a plurality of organic solvent based dispersions that are non-Newtonian fluids having fine particles dispersed therein are simultaneously applied in superposition onto a continuously running nonmagnetic support using an extrusion type applicator head, the improvement wherein the coating operation is performed in such a way that the Reynolds number, as determined by the average of the kinetic viscosity coefficients of said dispersions, the coating speed and the equivalent diameter during coating, is no more than 400, and that, simultaneously, the yield stress of at least the dispersion for the topmost layer is at least 10 dyne/cm$^2$.

2. The process of claim 1, wherein said Reynolds number is greater than 40.

3. The process of claim 1, wherein said Reynolds number is greater than 80.

4. In a process for producing a multi-layered magnetic recording medium in which a plurality of organic solvent based dispersions that are non-Newtonian fluids having fine particles dispersed therein are simultaneously applied in superposition onto a continuously running nonmagnetic support using an extrusion type applicator head, the improvement wherein the ratio of $\eta_T$ to $\eta_H$ is at least 50, where $\eta_H$ is the viscosity of the dispersions at the rate of shear that is exerted upon said dispersions when they are applied using the extrusion type applicator head, and $\eta_T$ is the viscosity of said dispersions at the shear rate for a time period between the end of application and the entrance of said medium into a subsequent drying zone.

5. The process of claim 4, wherein said ratio of $\eta_T$ to $\eta_H$ is no more than about 100.

6. The process of claim 4, wherein said ratio of $\eta_T$ to $\eta_H$ is no more than about 400.

7. In a process for producing a three or more layered magnetic recording medium in which at least three organic solvent based dispersions that are non-Newtonian fluids having fine particles dispersed therein are simultaneously applied in superposition onto a continuously running nonmagnetic support using an extrusion type applicator head, the improvement wherein the largest of the Reynolds numbers between two adjacent layers, as determined by the average of the kinetic viscosity coefficients of two of said dispersions above and below each interface, the coating speed and the equivalent diameter during coating, is no more than 400, and that, simultaneously, the yield stress of at least the dispersion for the topmost layer is at least 10 dyne/cm$^2$.

8. The process of claim 7, wherein said Reynolds number is greater than 40.

9. The process of claim 7, wherein said Reynolds number is greater than 80.

* * * * *

UNITED STATES PATENT AND TRADEMARK OFFICE
CERTIFICATE OF CORRECTION

PATENT NO. : 5,069,934

DATED : December 3, 1991

INVENTOR(S) : Naoyoshi Chino, et al.

It is certified that error appears in the above-identified patent and that said Letters Patent is hereby corrected as shown below:

On the the title page, item (30) Foreign Application Priority Data should read --Dec. 6, 1989 (JP) Japan ..........1-315480--.

Signed and Sealed this

Seventeenth Day of August, 1993

Attest:

BRUCE LEHMAN

Attesting Officer

Commissioner of Patents and Trademarks